(12) United States Patent
Allard

(10) Patent No.: US 6,241,882 B1
(45) Date of Patent: Jun. 5, 2001

(54) SUMP & FILTER DEVICE FOR DRAINAGE INLETS

(75) Inventor: Douglas Paul Allard, Santa Rosa, CA (US)

(73) Assignee: KriStar Enterprises, Inc., Cotati, CA (US)

( * ) Notice: Subject to any disclaimer, the term of this patent is extended or adjusted under 35 U.S.C. 154(b) by 0 days.

(21) Appl. No.: 09/399,587

(22) Filed: Sep. 20, 1999

(51) Int. Cl.$^7$ .................................................. B01D 35/02
(52) U.S. Cl. ..................... 210/162; 210/164; 210/170; 210/299; 210/482; 210/532.1; 404/4
(58) Field of Search ..................... 210/162, 163, 210/164, 170, 299, 473, 482, 532.1; 404/2, 4

(56) References Cited

U.S. PATENT DOCUMENTS

| | | | | |
|---|---|---|---|---|
| 705,447 | * | 7/1902 | Sargent | 210/299 |
| 893,915 | * | 7/1908 | Frazee | 210/299 |
| 1,507,531 | * | 9/1924 | Vaudell | 210/164 |
| 2,432,203 | * | 12/1947 | Miller | 210/532.1 |
| 2,497,577 | * | 2/1950 | Biggerstaff | 210/164 |
| 3,042,210 | * | 7/1962 | Hattori | 210/163 |
| 5,062,735 | * | 11/1991 | Gardin | 210/164 |
| 5,405,539 | * | 4/1995 | Schneider | 210/163 |
| 5,498,331 | * | 3/1996 | Monteith | 210/532.1 |
| 5,916,436 | * | 6/1999 | Devore et al. | 210/163 |
| 5,980,740 | * | 11/1999 | Harms et al. | 210/162 |

* cited by examiner

Primary Examiner—Christopher Upton
(74) Attorney, Agent, or Firm—Howrey Simon Arnold and White LLP

(57) ABSTRACT

A sump and filter device for use in drain inlets is disclosed. The device comprises a platform having one or more openings for receiving fluid flow. The platform is positioned and supported above the drain exits situated in the lower portion of the drain inlet. The platform is dimensioned for cooperative engagement with the interior perimeter or wall of the particular inlet involved. To inhibit fluid from entering the area of the inlet below the platform, a gasket or bladder may be positioned around the outer perimeter of the platform. An upwardly oriented fluid-receiving member having an upper end and a lower end and an opening therethrough is engaged with at least one of the openings of the platform. The opening in the fluid-receiving member is in fluid communication via its lower end with at least one of the openings in the platform. A filter body can be positioned at the upper end of the fluid-receiving member for filtering contaminants from fluid flow as fluid enters the upper end the fluid receiving member.

26 Claims, 2 Drawing Sheets

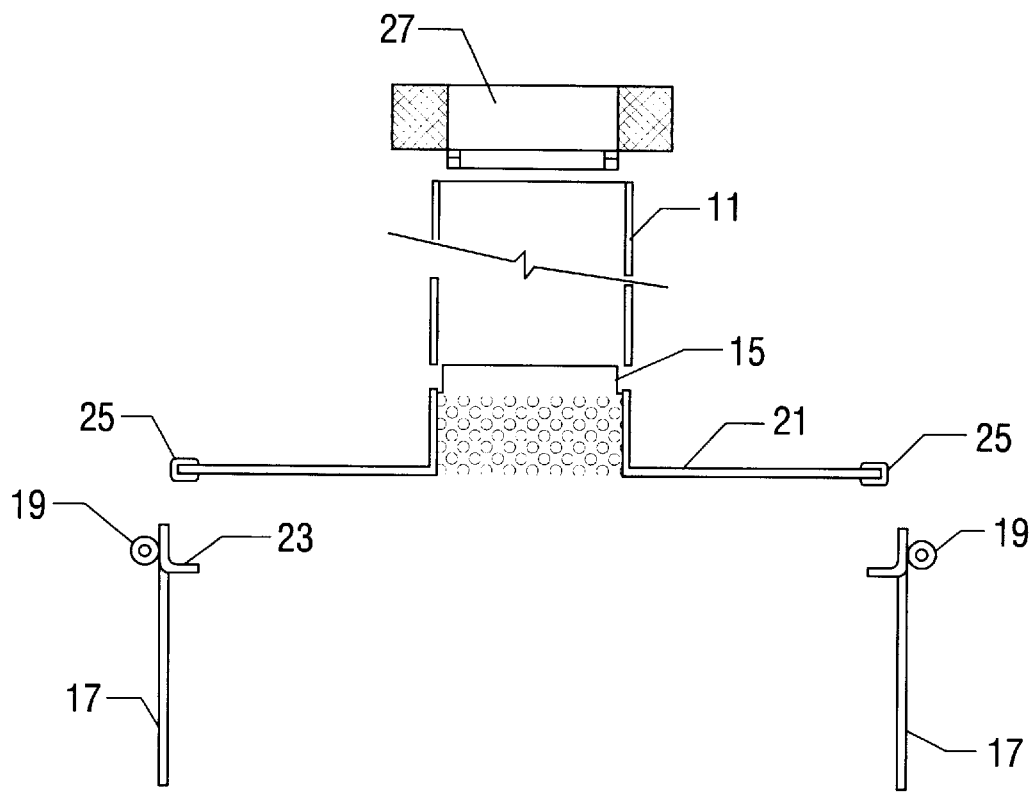
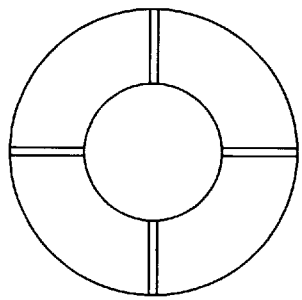
FIG. 3
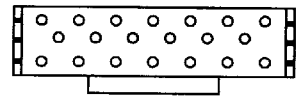
FIG. 4
FIG. 2

SUMP & FILTER DEVICE FOR DRAINAGE INLETS

FIELD OF THE INVENTION

The present invention relates to filtration systems for drain inlets, and more particularly to sump and filtration devices for drain inlets.

BACKGROUND OF THE INVENTION

Drainage systems provide a means for transporting fluid flow from surface areas to other areas such oceans, rivers, lakes, estuaries, streams and the like. Drain inlets or catch basins are the initial entry points of drainage systems.

Generally, a drain inlet comprises a walled structure having an open top for receiving fluid flow and one or more drain exits situated at its lower portion. The inlet is situated such that its top portion is at approximately surface level, and in many cases it is covered with a grate. Usually the drain exits are pipes exiting the drain inlet. Grates covering the top opening of the drain inlet serve to block larger items of debris contained in surface runoff, such as tree limbs and the like. However, smaller items of debris, sedimentation, pollutants and other contaminants pass readily through the grate and into the drain inlet and thereafter into the drainage system via the drain exits.

Although filtration systems for inhibiting the flow of debris, sediments, pollutants and other contaminants from entering the drainage system are desirable, it is important that the filtering system avoid restricting the ability of the drainage system to accommodate the desired volume of fluid flow. If the fluid flow, such as storm water runoff, is impeded, then flooding might occur. Accordingly, effective devices and systems are desired for inhibiting the entrance of debris, sedimentation, pollutants and other contaminants into drainage systems, while minimizing any restrictions to the capacity of the drainage system to receive fluid flow.

SUMMARY OF THE INVENTION

The present invention is directed to sump and filtering devices for use in drain inlets. The device comprises a platform having one or more openings therein and dimensioned for cooperative engagement with the interior perimeter of a drain inlet. An upwardly oriented fluid receiving member having an upper end and a lower end and an opening therethrough is engaged with at least one of the openings of the platform such that the opening in the fluid receiving member is in fluid communication via the lower end with at least one of the openings in the platform. In one embodiment a filter body is attached in cooperative engagement with the upper end of the fluid-receiving member. In another embodiment, a filter member is interposed between and in cooperative engagement with the lower end of the fluid receiving member and the platform.

The sump and filter device of the present invention can be supported in the inlet in a variety of ways. For example, the platform can comprise one or more support members extending downwards from the platform to support the platform above the drain exits in the lower portion of the inlet. In addition, the platform can be anchored in position using wall-mounting members for anchoring the platform in the desired position to the interior wall of the inlet. In order for the platform to inhibit the flow of fluid between the outer perimeter of the platform and the interior wall of the drain inlet, the device can further include a wall engagement member situated along at least a portion of the outer perimeter of the platform. For example, the wall engagement member can be a gasket. In addition, the wall engagement member may comprise a bladder, such as an inflatable bladder positioned at least partially around the outer perimeter of the platform. In addition, the bladder can contain an expandable foam material. In one embodiment, the bladder will provide both sealing engagement between the outer perimeter of the platform and the interior wall of the inlet and anchor the device within the inlet in the desired position.

Additional features and advantages of the present invention will be apparent form the drawings and the following detailed description of the invention.

BRIEF DESCRIPTION OF THE DRAWINGS

FIG. 2 is a partial side view of one embodiment of the present invention.

FIG. 3 is a top view of one embodiment of a filter body for use in the present invention.

FIG. 4 is a side view of an alternative embodiment of a filter body for use in the present invention.

DETAILED DESCRIPTION OF THE INVENTION

Figure 1:
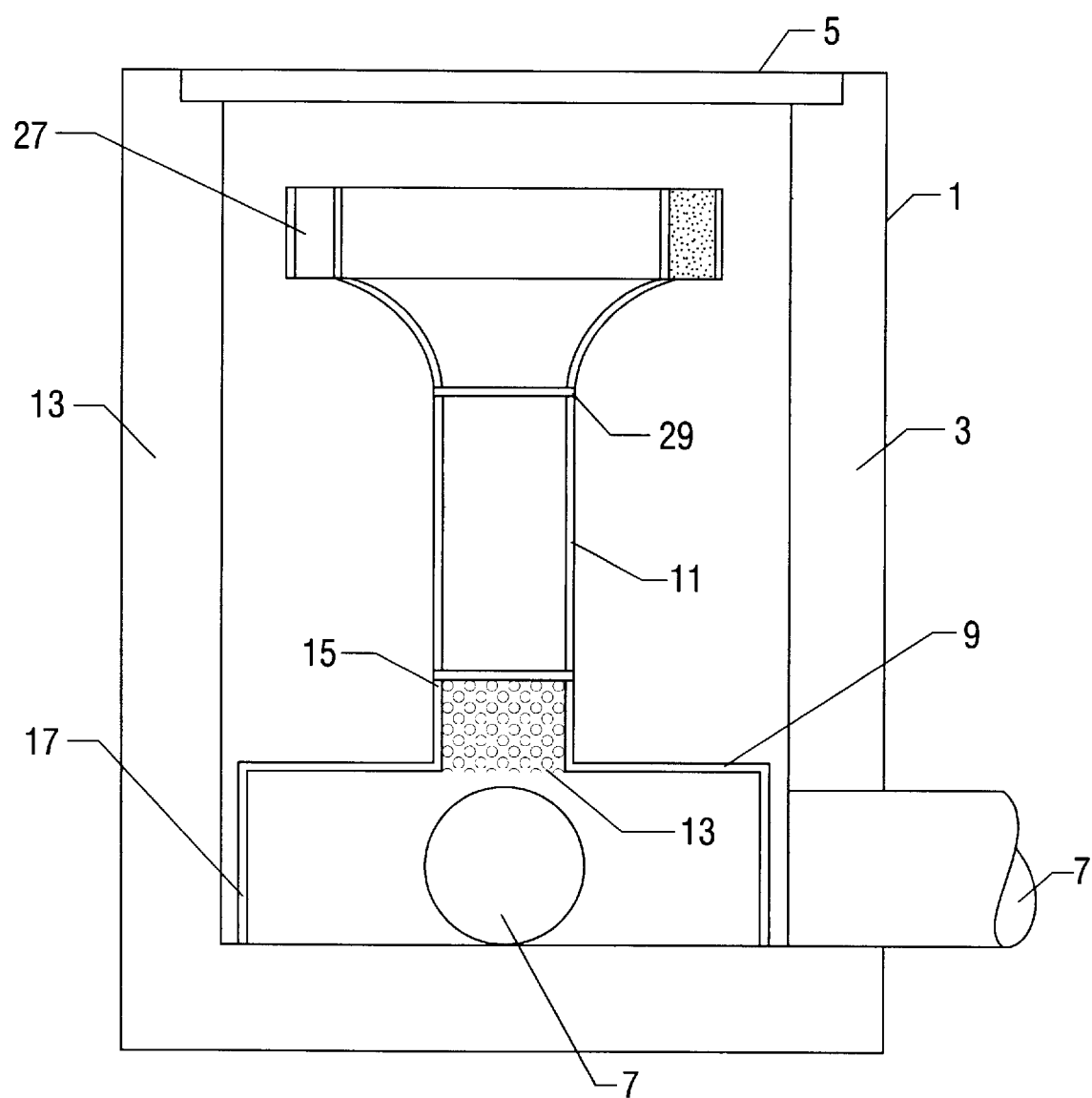
FIG. 1 is a cut away side view of a drain inlet system containing one embodiment of the present invention.

The present invention is directed to sump and filtering devices for use in drain inlets. A typical drain inlet or catch basin receives fluid, such as water from storm runoff and transports the fluid flow from surface level to drain pipes exiting the lower portion of the drain inlet. The fluid is then transported to another area, such as rivers, streams, lakes, bays, estuaries and the like.

In the present invention the device comprises a platform having one or more openings for receiving fluid flow. The platform is positioned and supported above the drain exits situated in the lower portion of the drain inlet. The drain inlet may be of a variety of shapes, such as round, square or rectangular. The platform is dimensioned for cooperative engagement with the interior perimeter or wall of the particular inlet involved. To inhibit fluid from entering the area of the inlet below the platform, a gasket or bladder may be positioned around the outer perimeter of the platform. An upwardly oriented fluid-receiving member having an upper end and a lower end and an opening therethrough is engaged in fluid communication with at least one of the openings of the platform.

In operation, fluid entering the drain inlet is inhibited from passing through the platform and the fluid begins to rise in the drain inlet until the fluid level is at a level equal to the height of the fluid-receiving member. Debris and sedimentation contained in the fluid is inhibited from entering the drain exits by the platform. Accordingly, the area above the platform defines a sump area for collecting debris, sediments, silt and the like. As the fluid rises above the level of the top end of the fluid-receiving member, the fluid begins to enter the upper end of the fluid-receiving member. Debris and sedimentation contained in the fluid tends to settle towards the platform, thereby inhibiting the flow of debris and sedimentation into the drain exits below the platform. The fluid entering the upper end of the fluid-receiving member passes through the fluid receiving member and through the opening in the platform and into the area of the drain inlet below the platform. Fluid then flows out of the drain inlet via the drain exits.

Referring to FIG. 1, one embodiment of the present invention is illustrated situated within a drain inlet. Drain inlet 1 is shown having drain inlet walls 3 and an upper opening covered by a grate 5. Drain exits 7 are situated in the lower portion of the drain inlet. Situated within the drain inlet is a sump and filter device having a platform 9 having an opening for receiving fluid flow. In the embodiment illustrated, the platform opening 13 is an upwardly extending fluid member, such as a riser stub 13. A fluid-receiving member 11, such as a riser pipe, is attached to the platform in an upwardly oriented direction. For convenience, the fluid receiving member can be attached to the platform opening via slip joint 15. Advantageously, the upwardly extending platform opening member 13 may be perforated such that as debris and sedimentation build up on the platform, fluid remaining in the debris and sedimentation may flow through the perforations and into the lower portion of the drain inlet The sump and filter device of the present invention can be supported in the inlet in a variety of ways. For example, in the embodiment illustrated in FIGS. 1 and 2, the platform comprises one or more support members 17 extending downwards from the platform to elevate the platform above the drain exits in the lower portion of the inlet. In addition, the platform can be anchored in position using wall-mounting members for anchoring the platform in the desired position to the interior wall of the inlet.

Referring to FIG. 2, a fluid receiving member is shown in conjunction with the platform connected via a slip joint 15. In order for the platform to inhibit the flow of fluid between the outer perimeter of the platform and the interior wall of the drain inlet, the device can further include a wall engagement member 19 situated along at least a portion of the outer perimeter of the platform. For example, the wall engagement member can be a gasket. In addition, the wall engagement member may comprise a bladder, such as an inflatable bladder positioned at least partially around the outer perimeter of the platform. In addition, the bladder can contain an expandable foam material. In an alternative embodiment, the bladder provides both sealing engagement between the outer perimeter of the platform and the interior wall of the inlet and anchors the device within the inlet.

Again referring to FIG. 2, in one embodiment of the invention the platform may comprise a baseplate 21 and a frame 23 and a frame sealing member 25 extending at least a portion of the way around the outer perimeter of the baseplate to inhibit fluid flow between the baseplate and the frame. In addition, support members 19 extend downwards from the frame 23 to support the platform in position.

Referring to the embodiment illustrated in FIGS. 1 and 2, a filter body 27 is shown attached in cooperative engagement with the upper end of the fluid-receiving member 11. For convenience, the filter body can be attached to the upper end of the fluid receiving member via slip joint 29. Referring to FIG. 3, a top view of a filter body is illustrated showing an opening in the center for receiving fluid flow. Referring to FIG. 4 the filter body can comprise a perforated member. In another embodiment, the filter body can comprise a housing containing a filter media for adsorbing contaminants such as hydrocarbons present in fluid flowing into the drain inlet.

The sump and filter device of the present invention may be constructed of any suitable materials. Preferred materials for the platform include high-density polyethylene (HDPE), plastic or fiberglass. Preferred materials for the fluid receiving member include HDPE or PVC or plastic piping. Preferred materials for the filter body includes plastic and stainless steel.

Numerous other variations and embodiments can be discerned from the above detailed description of the invention and illustrations thereof, and all such variations are encompassed within the scope and spirit of the present invention.

What is claimed is:

1. An apparatus, comprising:
   (a) a platform having one or more openings therein and dimensioned for cooperative engagement with the interior perimeter of a drain inlet;
   (b) an upwardly oriented fluid receiving member having an upper end and a lower end and an opening therethrough, said lower end of said fluid receiving member in cooperative fluid flow engagement with at least one of said openings of said platform, and
   (c) a filter body in cooperative engagement with said fluid receiving member.

2. The apparatus of claim 1 further comprising a filter member interposed between and in cooperative engagement with said lower end of said fluid receiving member and said platform.

3. The apparatus of claim 1 wherein said platform further comprises a wall engagement member situated along at least a portion of the perimeter of said platform.

4. The apparatus of claim 3 wherein said wall engagement member is a gasket.

5. The apparatus of claim 3 wherein said wall engagement member is a bladder.

6. The apparatus of claim 5 wherein said bladder contains an expandable foam material.

7. The apparatus of claim 1 wherein said filter body further comprises a filter media contained therein.

8. An apparatus, comprising:
   (a) a platform having one or more openings therein and dimensioned for cooperative engagement with the interior perimeter of a drain inlet;
   (b) an upwardly oriented fluid receiving member having an upper end and a lower end and an opening therethrough, said lower end of said fluid receiving member in cooperative fluid flow engagement with at least one of said openings of said platform;
   (c) a filter body in cooperative engagement with said upper end of said fluid receiving member; and
   (d) a filter member interposed between and in cooperative engagement with said lower end of said fluid receiving member and said platform.

9. The apparatus of claim 8 wherein said platform further comprises a wall engagement member situated along at least a portion of the perimeter of said platform.

10. The apparatus of claim 9 wherein said wall engagement member is a gasket.

11. The apparatus of claim 9 wherein said wall engagement member is a bladder.

12. The apparatus of claim 11 wherein said bladder contains an expandable foam material.

13. The apparatus of claim 8 wherein said filter body further comprises a filter media contained therein.

14. An apparatus, comprising:
   (a) a platform having one or more openings therein and dimensioned for cooperative engagement with the interior perimeter of a drain inlet said platform further comprising a wall engagement member situated along at least a portion of the perimeter of said platform;
   (b) an upwardly oriented fluid receiving member having an upper end and a lower end and an opening therethrough, said lower end of said fluid receiving member in cooperative fluid flow engagement with at least one of said openings of said platform;
   (c) a filter body in cooperative engagement with said upper end of said fluid receiving member, said filter body further comprising a filter media contained therein; and (d) a filter member interposed between and in cooperative engagement with said lower end of said fluid receiving member and said platform.

15. The apparatus of claim 14 wherein said wall engagement member is a gasket.

16. The apparatus of claim 14 wherein said wall engagement member is a bladder.

17. The apparatus of claim 16 wherein said bladder contains an expandable foam material.

18. A sump and filter system, comprising:

(a) a drain inlet having one or more walls defining an interior perimeter and having an upper portion having at least one opening for receiving fluid flow and a lower portion having one or more fluid exits;

(b) a platform situated within said drain inlet above said fluid exits and dimensioned for cooperative engagement with the interior perimeter of said drain inlet and having one or more openings therein;

(c) an upwardly oriented fluid receiving member having an upper end and a lower end and in cooperative fluid flow engagement with at least one of said openings of said platform and (d) a filter body in cooperative engagement with said fluid receiving member.

19. The apparatus of claim 18 further comprising a filter member interposed between and in cooperative engagement with said lower end of said fluid receiving member and said platform.

20. The apparatus of claim 19 wherein said platform further comprises a wall engagement member situated along at least a portion of the perimeter of said platform.

21. The apparatus of claim 20 wherein said wall engagement member is a gasket.

22. The apparatus of claim 20 wherein said wall engagement member is a bladder.

23. The apparatus of claim 22 wherein said bladder contains an expandable foam material.

24. The apparatus of claim 18 wherein said filter body further comprises a filter media contained therein.

25. An apparatus, comprising:

(a) a platform having one or more openings therein dimensioned for cooperative engagement with the interior perimeter of a drain inlet;

(b) an upwardly oriented fluid receiving member having an upper end and a lower end and an opening therethrough, said lower end of said fluid receiving member in cooperative fluid flow engagement with at least one of said openings of said platform; and (c) a bladder situated along at least a portion of the perimeter of said platform.

26. The apparatus of claim 23 wherein said bladder contains an expandable form material.

* * * * *

UNITED STATES PATENT AND TRADEMARK OFFICE
CERTIFICATE OF CORRECTION

PATENT NO. : 6,241,882 B1
DATED : June 5, 2001
INVENTOR(S) : Douglas Paul Allard It is certified that error appears in the above-identified patent and that said Letters Patent is hereby corrected as shown below:

Column 6,
Line 26, change "23" to -- 25 --
Line 27, change "form" to -- foam --

Signed and Sealed this

Fifteenth Day of January, 2002

Attest:

Attesting Officer

JAMES E. ROGAN
Director of the United States Patent and Trademark Office